United States Patent [19]

Engelmann

[11] Patent Number: 4,982,148
[45] Date of Patent: Jan. 1, 1991

[54] POWER FACTOR MAINTENANCE SYSTEM

[76] Inventor: Rudolph H. Engelmann, 1749 Golf Rd., #155, Mount Prospect, Ill. 60056

[21] Appl. No.: 444,381

[22] Filed: Dec. 1, 1989

[51] Int. Cl.$^5$ ............................................. G05F 1/70
[52] U.S. Cl. .................................... 323/207; 323/211
[58] Field of Search ............... 323/207, 208, 209, 210, 323/211

[56] References Cited

U.S. PATENT DOCUMENTS

| | | | |
|---|---|---|---|
| 3,859,542 | 1/1975 | Kennedy | 307/88 |
| 3,909,698 | 9/1975 | Nill | 363/128 |
| 3,909,821 | 9/1975 | Jagoda et al. | 340/310 |
| 3,913,002 | 10/1975 | Steigerwald et al. | 363/124 |
| 4,013,937 | 3/1977 | Pelly et al. | 363/161 |
| 4,119,907 | 10/1978 | Quinn | 323/105 |
| 4,139,723 | 2/1979 | Havas | 13/26 |
| 4,356,440 | 10/1982 | Curtiss et al. | 323/210 |
| 4,413,217 | 11/1983 | Green et al. | 318/729 |
| 4,482,857 | 11/1984 | Porche et al. | 323/205 |
| 4,544,502 | 11/1985 | Rohatyn | 323/208 |
| 4,590,416 | 5/1986 | Porche et al. | 323/205 |
| 4,672,298 | 6/1987 | Rohatyn | 323/208 |
| 4,673,888 | 6/1987 | Engelmann et al. | 330/10 |
| 4,680,689 | 7/1987 | Payne et al. | 363/26 |
| 4,683,529 | 7/1987 | Bucher | 323/207 |
| 4,716,353 | 12/1987 | Engelmann et al. | 320/21 |
| 4,717,889 | 1/1988 | Engelmann | 330/297 |
| 4,831,508 | 5/1989 | Hunter | 363/44 |
| 4,853,837 | 8/1989 | Gulczynski | 363/80 |
| 4,855,890 | 8/1989 | Kammiller | 363/44 |
| 4,885,675 | 12/1989 | Henze et al. | 323/211 |

Primary Examiner—Steven L. Stephan
Assistant Examiner—Jeffrey Sterrett
Attorney, Agent, or Firm—Leydig, Voit & Mayer

[57] ABSTRACT

In an AC-to-DC converter, a switched inductor, in the form of a ringing-choke or flyback DC-to-DC power converter, is interposed between the AC line input rectifier and the DC storage capacitor. In accordance with the relationship Inductance/Time equals Voltage/Current the inductance and on-time of the switched inductor are held constant so that the instantaneous input voltage and current maintain a directly proportional relationship, thereby imparting a resistive characteristic to the input impedance—i.e., the input reactance vector is held to near zero rotation. Hence, the input power factor is held close to unity. Means are included for varying the values of the inductor and/or time in response to changing load requirements.

32 Claims, 8 Drawing Sheets

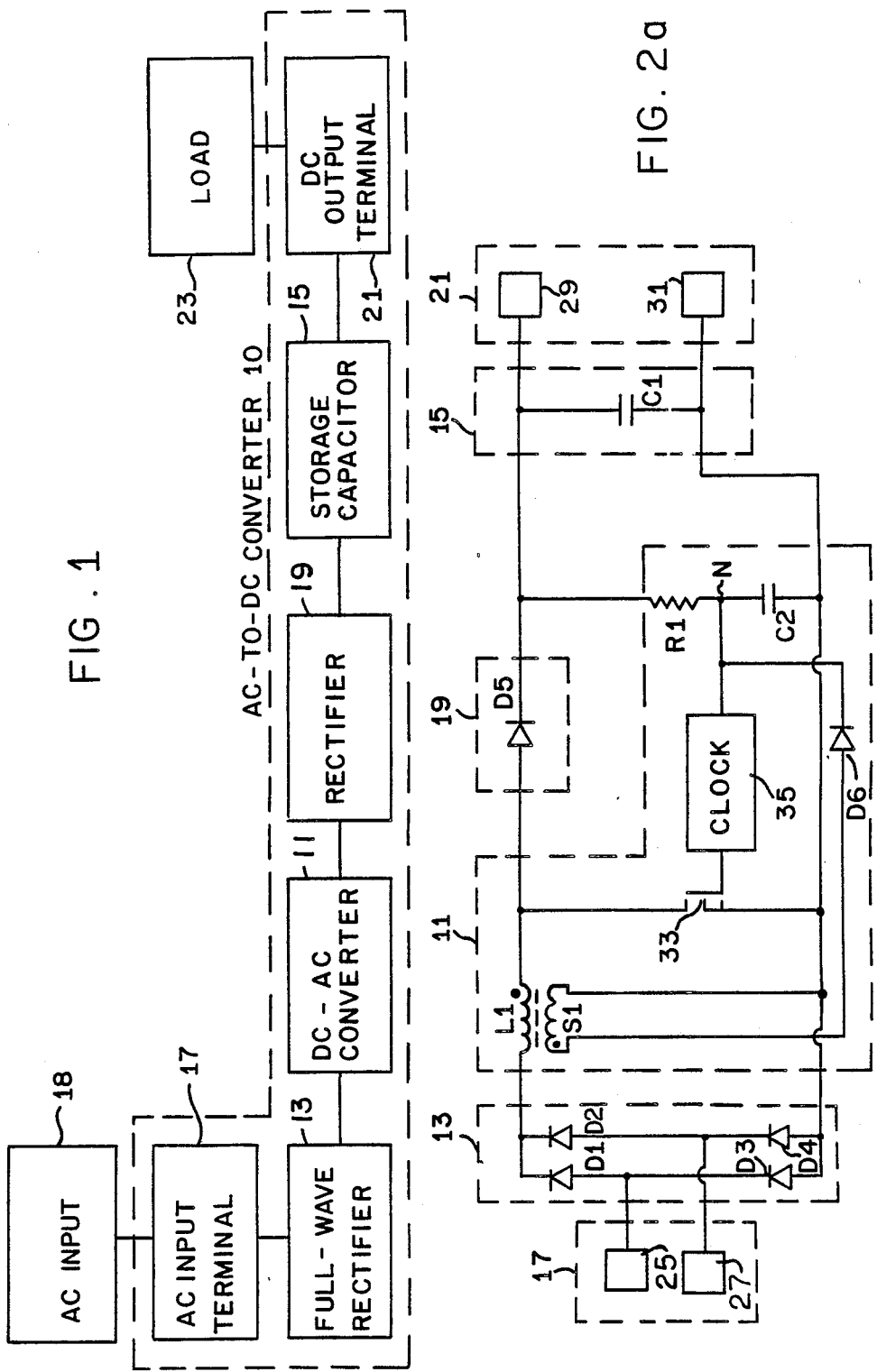

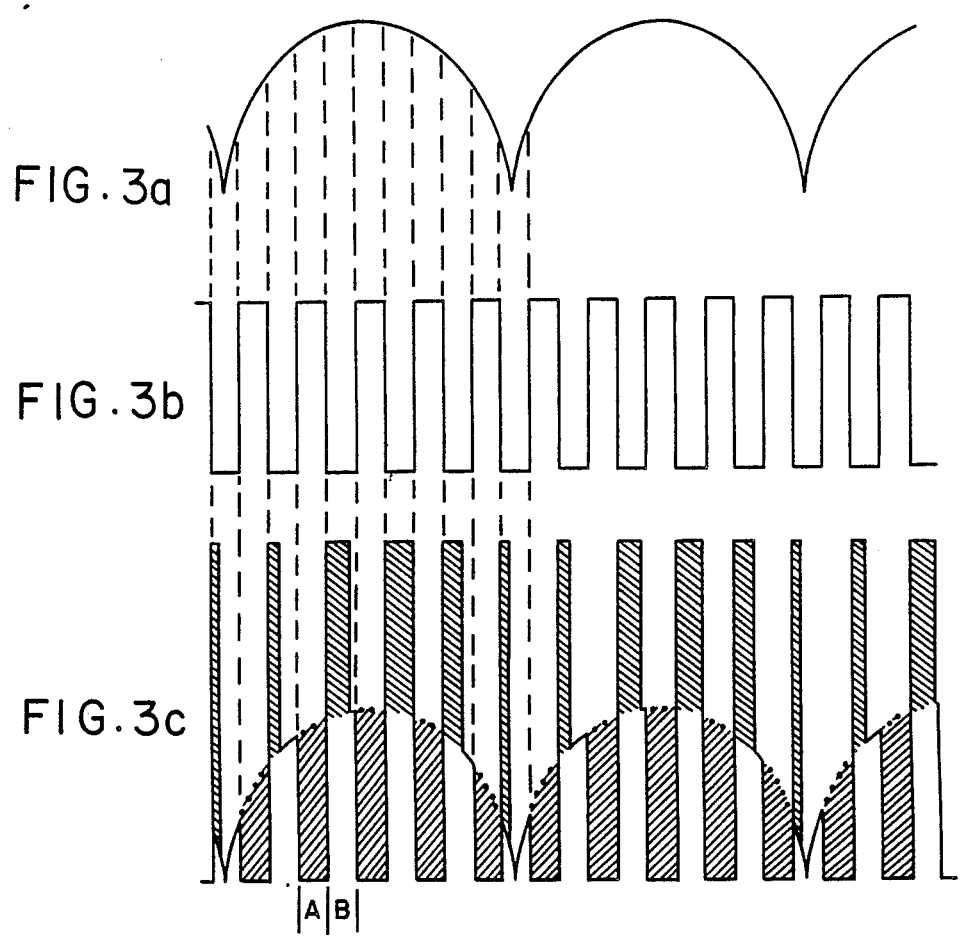

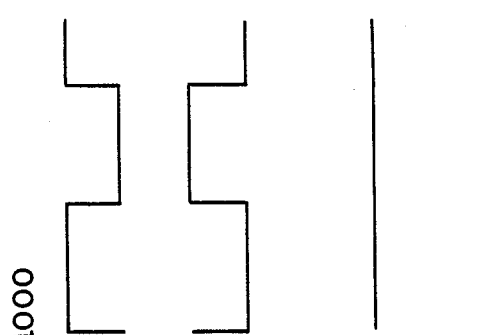
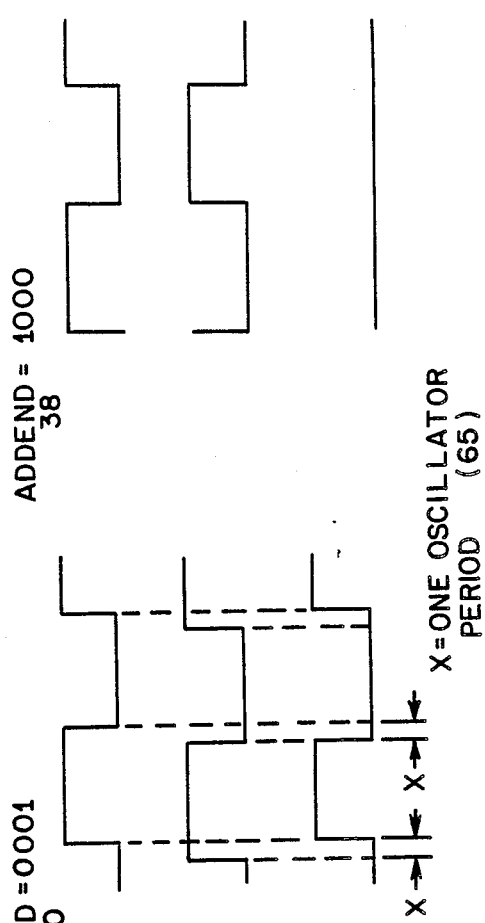
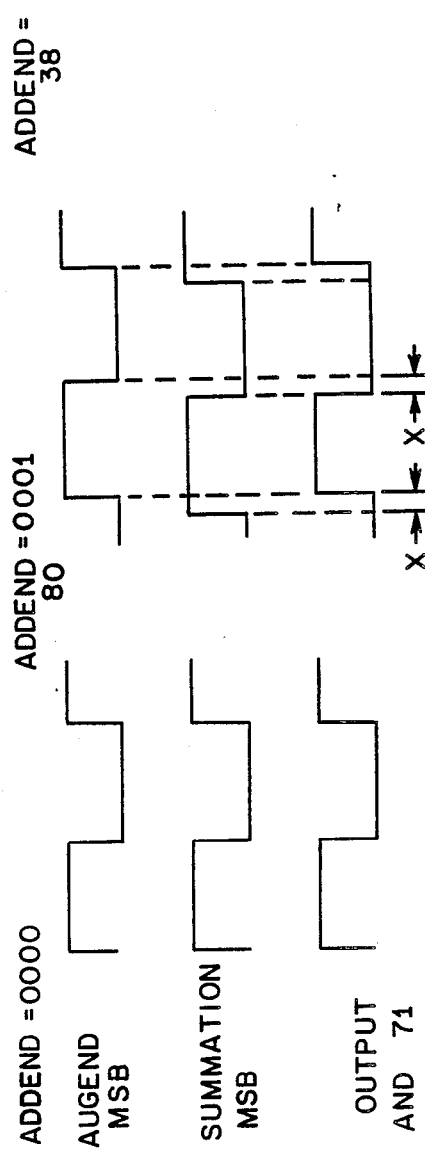
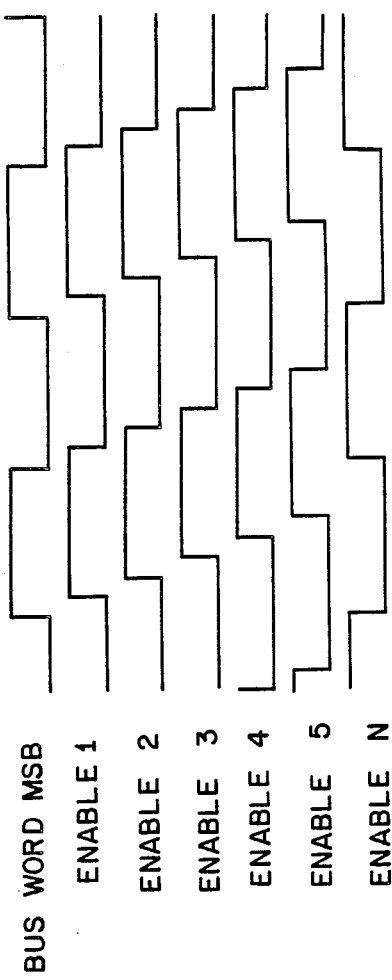

POWER FACTOR MAINTENANCE SYSTEM

FIELD OF THE INVENTION

The field of the present invention relates generally to AC-to-DC converters, and more specifically to preventing low power factors that are presently generated by these converters.

BACKGROUND OF THE INVENTION

Known means for converting AC electrical power to DC power generally comprise in combination a rectifier and a storage capacitor. This combination presents a capacitive reactance to the power input line which effects the power factor of the AC-to-DC conversion. Such reactance looks like negative resistance—i.e., as the line voltage decreases, the line current increases. As a result of this negative resistance, the load may appear to be up to 60% heavier than it actually is—i.e., the AC power source must supply 60% more power than is actually consumed by the real load. In the field of the present invention, the efficiency of the input to output transfer of power by an AC-to-DC converter is typically measured as a power factor, which is the ratio of the total output power in watts to the total apparent power in volt-amperes at the AC input. The negative economics of low power factors are becoming intolerable as AC-to-DC converters become ubiquitous in industry and society. For example, most digital electronic equipment requires an AC-to-DC conversion in their power supplies.

SUMMARY OF THE INVENTION

The primary object of this invention is to provide a very high power factor for AC-to-DC converters.

Another object of the invention is to provide an AC-to-DC converter having a high power factor over varying load conditions.

It is still another object of the invention to provide an AC-to-DC converter having a high power factor whose DC output voltage may be adjusted over a broad range of possible voltages.

It is yet another object of the invention to provide the foregoing objects while maintaining electrical isolation between the input and output of an AC-to-DC converter.

Briefly, the invention provides for maintaining a power factor of unity to an AC power source by interposing a flyback or ringing choke power converter between the rectifier output and the capacitor that conventionally filters the rectifier output power. When the inductor is connected across the input recitifer means, current (I) flows through the inductor (L1) in accordance with the relationship, $$I = \frac{E \cdot T}{L} = \frac{E}{R_{APPARENT}}$$

where E is the input voltage to the inductor L and T is the duration of the time interval the inductor is connected. These relationships fulfill the requirements for a power factor of unity.

During the off time of the inductor, the collapsing magnetic field induces current flow in the inductor winding, and this flow is directed to the load. It is important that the off-time is sufficient in each cycle time to transfer all of the energy from the inductor to the load. Otherwise, a continuous current flows through the inductor and destroys the value of E·T/L. With source current and output current flowing in different time frames, the load impedance is effectively isolated from the source.

Power from the AC power input is thus transferred to the load in a two step process: First, energy is stored in the magnetic field of the inductor during the time it is connected across the rectified AC input. Second, the stored energy is transferred to the load during the time the inductor is disconnected. By repeating the connection and disconnection of the inductor at a high frequency relative to the AC input frequency, the current and voltage of the AC input remain in phase regardless of the impedance vector angle of the load.

For varying load impedances, means are provided for adjusting either or both inductance and time in the $L/T = E/I$ expression in order to increase or decrease the power passed to the load with each connect/disconnect cycle of the inductor. In order to maintain the in-phase relationship between the input current and voltage, however, changes in the L or T values can only be made at the beginning of a cycle of the AC power input. If such changes occur during a cycle of the AC power input, the distribution of the power metered to the load becomes skewed with respect to the AC power input voltage, thereby causing a phase shift between the input current and voltage, and lowering the power facter.

BRIEF DESCRIPTION OF THE DRAWINGS

The various embodiments of the present invention will be described with reference to the following drawings in which like items are indicated by the same reference numbers.

FIG. 1 is a block diagram of an AC-to-DC converter in accordance invention.

FIG. 2a a schematic diagram of an AC-to-DC converter according to a first simplified embodiment of the invention.

FIG. 3a an exemplary waveform diagram of the output of the full-wave recitifier of FIGS. 1 and 2a-2c.

FIG. 3b is an exemplary waveform diagram of a control signal used in a DC-to-DC converter incorporated in the AC-to-DC converters of FIGS. 1 and 2a-2c for alternately inserting and removing an inductor across the output of a power input rectifier.

FIG. 3c is an exemplary waveform diagram of the voltage across the switch means in FIGS. 2a-2c.

FIGS. 5a-5c illustrate the change in duty cycle imparted to the control signal of the DC-to-DC converter using the control circuit of FIG. 4.

FIG. 9 an exemplary waveform diagram illustrating the timing relationship between the flyback-type DC-to-AC converters in the embodiment of FIG. 8.

DESCRIPTION OF THE PREFERRED EMBODIMENTS OF THE INVENTION

Figure 2B:
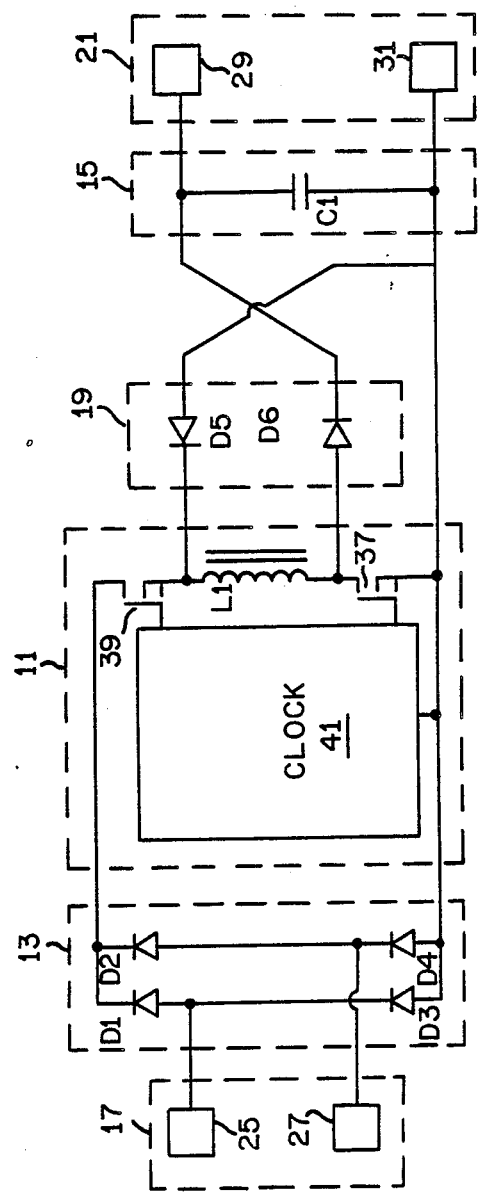
FIG. 2b is a schematic diagram of an AC-to-DC converter according to a second simplified embodiment of the invention, having the features of the embodiment of FIG. 2a and also providing for a range of DC output voltages less than twice the rated peak input voltage.

Turning to the drawings and referring first to FIG. 1, an AC-to-DC converter 10 according to the invention incorporates a DC-to-AC converter 11 interposed between a full-wave rectifier 13 and a storage capacitor 15. The DC-to-AC converter 11 may be of several different types. The converter 11 employs an inductor that is alternately connected and disconnected across a rectified AC input. By interposing the DC-to-AC converter 11 between AC input termini 17 and the storage capacitor 15, power input is maintained substantially 180° out of phase with power output. As a result of this phasing, the impedance characteristics of the load on the AC-to-DC converter 10 are effectively isolated from the AC input 17. This isolation allows the input impedence vector to be substantially at zero degrees of rotation. In this regard, the AC-to-DC converter 10 appears at its input termini 17 to be a substantially resistive element as explained more fully hereinafter.

A purely resistive device is characterized by a power factor of unity. Therefore, by providing an AC-to-DC converter 10 that can be modeled as a resistive device, a power factor of unity is obtained. By positioning the DC-to-AC converter 11 and a rectifier 19 between the full-wave rectifier 13 and the storage capacitor 15, the capacitive reactance of the storage capacitor is not presented to the AC input terminals 17. Furthermore, any reactance of a load 23 is also isolated from the AC input 18. From the storage capacitor 15, the DC voltage is presented to DC output termini 21 across the load 23.

Isolation of the AC input termini 17 from the reactance of the storage capacitor 15 and the load 23 is achieved by transferring power from the AC input terminals to the DC output terminals 21 in two steps, as follows: Input energy is stored in the gap of the inductor core. The stored energy is secondly transferred to the storage capacitor 15 and/or load 23 by way of the rectifier 19. It is important that all of the energy accumulated in the first step is transferred to the storage capacitor 15 and/or the load 23 in the second step so that continuous current does not flow through the inductor in the DC-to-AC converter 11. If a continuous current flow does occur, the phase of the input current will rotate relative to the phase of the input voltage, thereby destroying the primary object of the invention—i.e., achieving a power factor of unity.

In order to ensure continuous current does not flow through the inductor of the DC-to-AC converter 11, the product of the time (T) the inductor L1 is placed across the rectifier 13 and the mean average voltage (E) across the inductor during that time must not exceed the product of the off-time ($\overline{T}$) and mean average off-time voltage ($\overline{E}$) across the inductor. A deficiency in the product of $\overline{T} \cdot \overline{E}$ with respect to the product of T·E will result in continuous current flow through inductor L1, which will rotate the phase of the input current relative to the phase of the voltage.

Figure 2C:
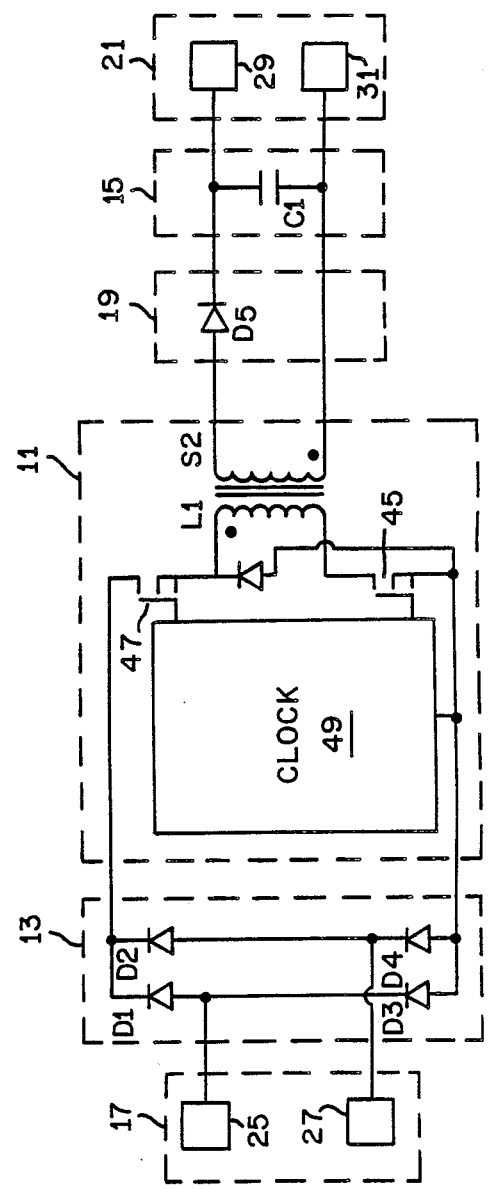
FIG. 2c a schematic diagram of an AC-to-DC converter according to a third simplified embodiment of the invention, having the features of the embodiment of FIG. 2b and also providing for input/output isolation.

Refer now to the schematic diagrams of FIGS. 2a–2c, that show three alternative embodiments of the AC-to-DC converter 10 according to the invention, each using a different configuration of the storage inductor L1 in a flyback arrangement. In these embodiments, the foregoing first and second steps of energy transfer are maintained if load 23 is assumed to be static. In the embodiments of FIGS. 4–7, the foregoing first and second steps of energy transfer are maintained for both static and dynamic loads 3 as explained hereinafter.

For the purpose of additional clarity, each of the AC-to-DC converters in FIGS. 2a–2c include boxes formed by broken lines that delineate the components which correspond to the functional blocks of FIG. 1. Specifically referring to FIGS. 2a–2c, the AC input termini 17 of FIG. 1 are illustrated as input lines 25 and 27. The full-wave rectifier 13 of FIG. 1 is realized in FIGS. 2a–2c by a conventional diode bridge comprising diodes D1–D4. The rectifier 19 of FIG. 1 is implemented by the diode D5 in FIGS. 2a and 2c. Diodes D5 and D6 perform the high frequency rectification in FIG. 2b. Capacitor 15 of FIG. 1 is detailed by capacitor C1. Finally, the DC output termini 21 of FIG. 1 correspond to the output termini 29 and 31 in FIGS. 2a–2c.

In the embodiments shown in FIGS. 2a–2c, different versions of flyback-type converters are detailed for the DC-to-AC converter 11. Turning first to FIG. 2a, the DC-to-AC converter comprises an inductor L1, a MOSFET switch 33, a variable duty-cycle clock 35 such as a UC1844 manufactured by Unitrode Corporation, 5 Forbes Road, Lexington, Mass. 02173 and a series connected resistor R1 and capacitor C2 that provide start-up power to the clock 35. The clock 35 varies its duty cycle in response to the voltage at the node N between the series connected resistor R1 and capacitor C2. A secondary winding S1 provides sustaining power to the clock 35 by way of diode D6.

As shown in FIG. 3b, the clock 35 produces a high frequency rectangular wave that is applied as a gate signal to the MOSFET switch 33. As the gate signal of the MOSFET rises above the turn-on threshold of the switch, its channel resistance drops to a low value, placing the inductor L1 across the output of the full-wave rectifier 13. The output of the full-wave rectifier 13 is illustrated in FIG. 3a. With the inductor L1 placed across the full-wave rectifier 13, current flow in the inductor increases linearly from zero according to the relationship $$I = \frac{E \cdot T}{L} \quad (1)$$

where I is current through the inductor L1, E is the voltage across it, T is the time period the voltage is applied, and L is the inductance of L1.

By repeating the connection times (T) at a high rate (e.g., 200 KHz) with respect to the frequency of the AC input signal (e.g., 60 Hz), a voltage change during the connection time (T) of the inductor (L1) approaches zero and the factors of equation (1) are substantially constant within each time sample and instantaneous current (I) is proportional to (T) as (L) is held constant. By maintaining the constant values of the time (T) and inductor (L1) over a complete cycle of the AC input signal, equation (1) dictates that the current (I) will be proportional to, and substantially in phase with the voltage (E) over the cycle time and, therefore, power factor of unity is substantially realized.

With the clock 35 operating at its maximum duty cycle (e.g., 50 percent), the drain-source voltage waveform is shown in FIG. 3c wherein the output voltage exceeds the pulsating DC peak input voltage of FIG. 3a by a factor greater than two (2). The output voltage necessarily exceeds twice the peak input voltage in order that all energy stored in the inductor during an on-time interval A (FIG. 3c) is transferred to the output 21 during the following off-time interval B. Specifically, the shaded area of the on-time interval A corresponds to the volt-time product of the rectified AC input during the time interval the inductor L1 is connected across the rectified AC input. The shaded area during the off-time interval B is the volt-time product across inductor L1 occurring within the time it is disconnected from across the rectified AC input. To ensure that inductor (L1) does not continuously conduct current, thereby adding a factor to equation (1), the volt-time products represented by the shaded areas in the time intervals A of FIG. 3c must be equal to the shaded areas in the time intervals B.

In the DC-to-DC converter of FIG. 2b, two MOSFET switches 37 and 39 are connected in series with the inductor L1. The gate of each switch 37 and 39 is driven by a clock control 41 similar to the clock 35 of FIG. 2a, and the switches 37 and 39 are turned on and off in synchronism. This means allows an output voltage that is less than twice the rated peak input voltage.

By providing inductor L1 with a secondary winding S2 in the manner suggested by the flyback-type converter illustrated in FIG. 2c, current may flow in either L1 (S1) or L1 (S2), but not both at any given instant. Therefore, energy is stored in the core gap of the inductor L1 when MOSFET switches 45 and 47 are turned on by a clock control 49. Like the converter of FIG. 2b, the clock control 49 is similar to the clock 3 of FIG. 2a. When the switches 45 and 47 are turned off, the gap energy is released by the collapsing magnetic field inducing current in the circuit comprising winding L1 (S2), diode D5, and the parallel circuit comprising the load and capacitor C1. Although not shown, leakage power must be snubbed by any of several means well known in the art to prevent voltage-induced breakdown of any circuit component, particularly the transistors. In addition to providing for a variable DC output voltage that can be greater or less than the input voltage, the converter of FIG. 2c also provides for electrical isolation between the input and output.

As can be seen from the foregoing examples of DC-to-AC converters 11, any DC-to-AC converter used in the invention must include an energy storage element such as the inductor L1 that stores and releases energy in phase isolated steps. Generally, these type of converters are known in the art as "flyback" converters.

For variable loading, a desired DC output voltage can be maintained by varying T or L in equation (1). By varying either of these factors, more or less energy is transferred to the load during each cycle of intervals A and B. In keeping with the invention, however, a change in T or L must only be made at zero degrees or 180° of a cycle of the AC input, but not both. In order to ensure this condition is met, a zero crossover detector is incorporated into the DC-to-AC converter 11 so that factor changes (e.g., duty cycle) occur only at 0° or 180° of an input cycle.

Figure 4:
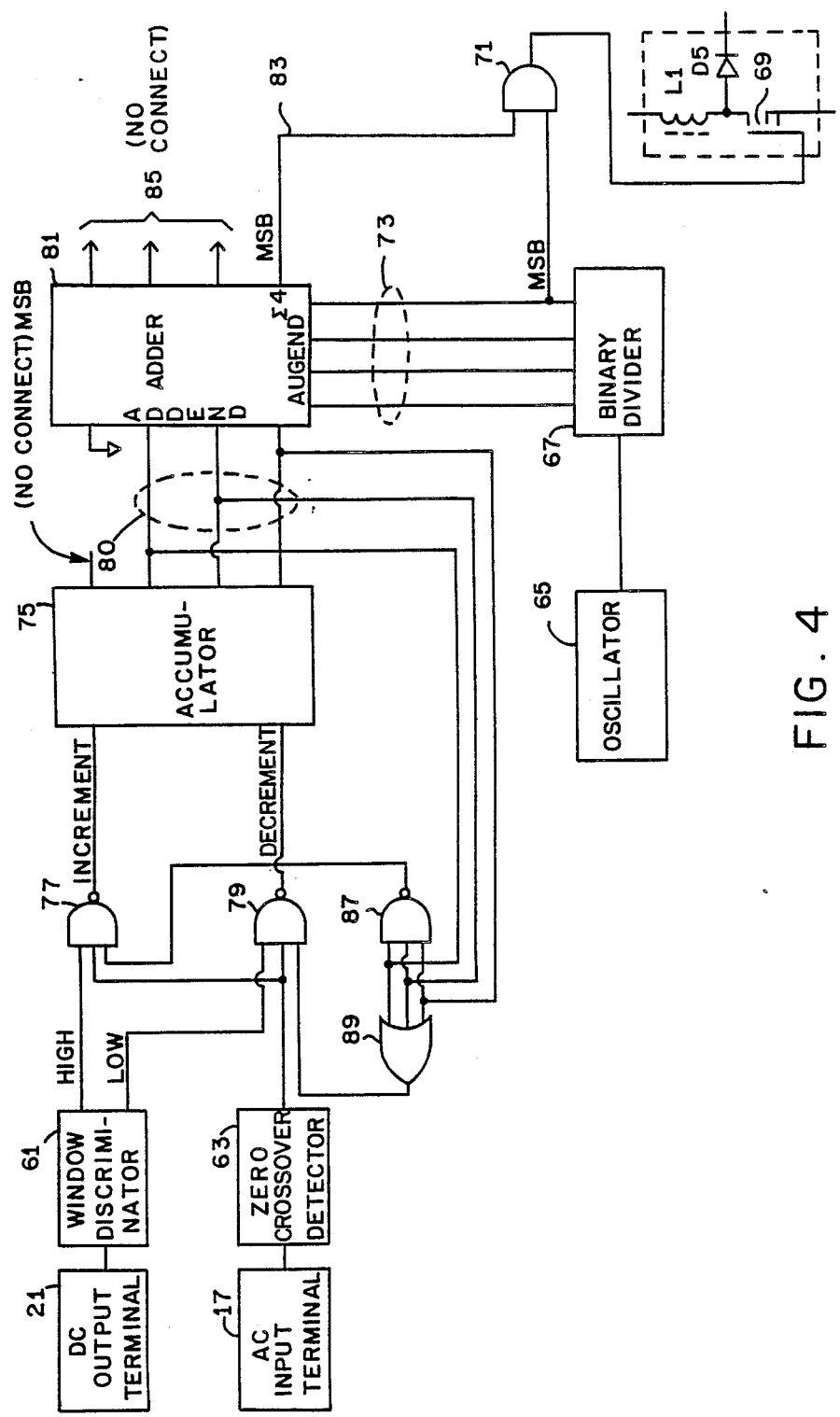
FIG. 4 is a schematic diagram of a control circuit within a DC-to-DC converter for adjusting the duty cycle of the control signal in FIG. 3b in acordance with a fifth embodiment of the invention.

An example of a circuit for varying T in equation (1) is shown in FIG. 4. Responding to deviations in the DC output voltage, the digital circuit in FIG. 4 varies the on/off duty cycle time of the MOSFET switch or switches in FIGS. 2a–2c.

Referring more particularly to the circuit of FIG. 4, the clocking of any of the DC-to-AC converters 11 in FIGS. 2a–2c may be modified by adding a window discriminator 61 that senses the voltage at the DC output termini 21 and a zero crossover detector 63 for sensing positive-to-negative or negative-to-positive transitions, but not both. The window discriminator 61 is of conventional design that monitors the DC voltage at the output termini 21 of the converter 10 (FIG. 1). Zero crossover detectors are well known in the art. An oscillator 65 and binary divider 67 set the fundamental frequency (e.g., 200 KHz) of an on/off cycle for a MOSFET switch 69 that is exemplary of the switches in the DC-to-AC converters 11 in FIGS. 2a–2c. The most significant bit (MSB) output from the binary divider 67 is fed to one input of an AND gate 71. In the illustrated embodiment, the divider 67 may simply be a binary counter with a four-bit output 73 whose MSB is connected to one of the inputs of the AND gate 71.

To change the duty cycle of the fundamental frequency established by the MSB from the divider 71, an accumulator 75 responds to the window discriminator 61 sensing excursions of the output voltage of the AC-to-DC converter 10 above or below predetermined limits that define the preferred range of voltages. When the window discriminator 61 senses a voltage at the output terminal 21 that exceeds the window upper limit, a first output line connected to a NAND gate 77 goes high. On the other hand, if the DC output voltage falls below the lower limit of the window, a second output line from the discriminator 61 connected to the input of a NAND gate 79 goes high.

The outputs of NAND gates 77 and 79 are connected to the increment and decrement inputs, respectively, of the accumulator 75. An example of an appropriate accumulator is digital logic type 74LS193 integrated circuit manufactured by Motorola, Inc. of Phoenix, Ariz. In response to a signal on the increment or decrement input lines, the accumulator 75 presents a four-bit binary word 80 to a four-bit adder 81 of conventional configuration. The binary word 73 from the divider 67 adds to binary word 80 from the accumulator. The most significant bit (MSB) 83 of the summation 85 is delivered as the second input to the AND gate 71.

In FIG. 4, the zero crossover detector 63 is responsive to the signal at the AC input terminal 17 for providing an output that is received by each of the two NAND gates 77 and 79. The output of the zero crossover detector 63 effectively functions to synchronize any increment or decrement signal to the accumulator 75 with the input AC zero crossover. By synchronizing the change in duty cycle provided by the circuit of FIG. 4 with a zero crossover of an AC power input, the proportional relationship between the input current and voltage maintains its appearance as substantially resistive, and, thereby, no significant rotation of the phase of the current occurs with respect to the voltage.

Referring now to FIGS. 5a–5c, it will be appreciated that the MSB output of the divider 67 is synchronous with the MSB output of the adder 81 when the input to the addend is zero. FIGS. 5a–5c illustrate the timing of the MSB of the divider 67, the timing of the MSB of the summation output of the adder 81 and the resulting timing of the two MSBs at the output of the AND gate 71.

In order to demonstrate how the circuit of FIG. 4 adjusts the duty cycle of the fundamental on/off frequency of the switch 69 in the DC-to-AC converter 11, assume that the DC output voltage has risen to exceed the upper limit voltage provided by the window discriminator 61. In response to this voltage condition, the output signal from the discriminator to the NAND gate 77 goes high. If one or more bits of the binary word 80 from the accumulator 75 is low, the output of gate 87 is high to further enable gate 77. Gate 77 is completely enabled by the zero crossover detector 63. In response to this complete enablement of gate 77, the output of the accumulator 75 increments one bit to a value of 0001. The output of the adder 81 no leads the augend input from the divider 67 by period of the oscillator 65. Therefore, the MSB 83 of the summation 85 from the adder 81 leads the MSB of the divider 67. The waveform of FIG. 5b shows the phase of the MSB summation waveform leading the phase of the augend MSB waveform from the divider 67 by one oscillator period.

Referring again to FIG. 4, the two inputs of the AND gate 71 that receive the MSB signals from the divider 67 and adder 81 provide for an output signal of the same or zero frequency as the MSB of the divider, regardless of the value of the addend from the accumulator 75. The value of the addend determines the phase relationship between the MSB of the divider 67 and the MSB 83 of the summation 85. By phase shifting one MSB, the output of AND gate 71 changes its duty cycle by an amount proportional to the amount of the phase shift. If the voltage at the DC output terminal 21 continues to exceed the range of voltages set in the window discriminator 61, the input to the NAND gate 77 from the discriminator will continue to be high and the high will continue to be clocked into the increment input of the accumulator 75 in synchronism with the zero crossings of the AC input. If the accumulator 75 continues to increment, it will reach the argument 1000. As can be seen from the waveforms of FIG. 5c, this value of the addend results in a full phase shift between the MSBs of the adder 81 and divider 67. As a result of this 180° phase shift, the output of the AND gate 71 remains low over the full cycle of the AC input signal. In such a case, the switch 69 remains off and no power is transferred to the output of the converter 10 by way of the inductor L1 and diode D5.

Once the addend reaches the value 0111, NAND gate 87 disables the NAND gate 77 so that the accumulator 75 does not increment the addend any further. When the addend 75 falls to 0000, OR function 89 disables NAND gate 79, thereby preventing further decrementing of the accumulator 75.

Figure 6:
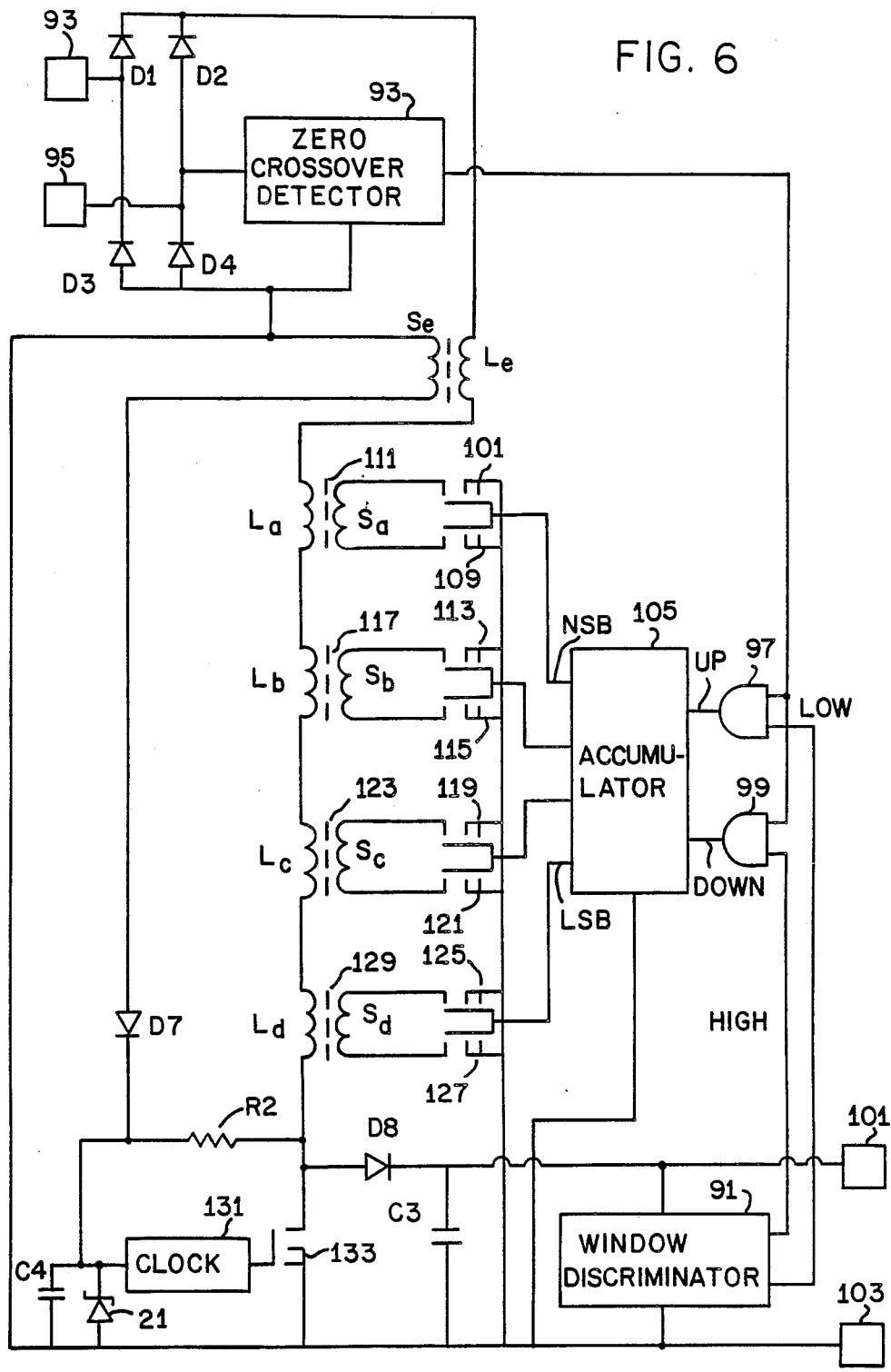
FIG. 6 is a sixth embodiment of the invention illustrating discrete series-connected inductances and a control circuit for realizing variable inductance in a flyback-type DC-to-DC converter that provides variable output power.

Instead of adjusting the on-time (T) in the DC-to-AC converter 11 in order to change the volt-time product, the value of L1 may be varied in response to a changing load 23. The AC-to-DC converter in FIG. 6 illustrates a means for varying the value of L1 in response to a window discriminator 91 and a zero crossover detector 93 in order to maintain the DC output voltage within a preferred voltage range. The inductance L1 in the DC-to-AC converter of FIG. 6 comprises five (5) discrete inductors $L_a$, $L_b$, $L_c$, $L_d$ and $L_e$. As inductors add in series connection, the inductance L1 of the converter may be as great as $$L1 = L_a + L_b + L_c + L_d + L_e \qquad (2)$$

Any one or combination of the inductors may be cancelled in the series connection by selectively shorting secondary windings $S_a$, $S_b$, $S_c$, and $S_d$. The circuit for controlling the value of L1 is in binary format; therefore, the inductances $L_a$, $L_b$, $L_c$, $L_d$ and $L_e$ are weighted such that if the inductance L has the value of one (1) unit, the inductances $L_a$, $L_b$, $L_c$ and $L_d$ have the values 16, 8, 4 and 2 units, respectively.

The AC power present at the input termini 93 and 95 of the converter in FIG. 6 is full-wave rectified by rectifiers D1, D2, D3 and D4. The anodes of rectifiers D3 and D4 and the AC input terminal 95 form two inputs to the zero crossover detector 93. In response to these inputs, the zero crossover detector 93 delivers an enabling signal to AND gates 97 and 99 when the AC input voltage crosses zero in the preferred direction. The window discriminator 91 monitors the DC output termini 101 and 103 to enable AND gate 99 when the DC output voltage is below a lower limit of the window. Likewise, window discriminator 91 enables AND gate 97 when the DC output voltage exceeds an upper limit of the window. The output of AND gate 97 clocks an accumulator 105 to increment to the output word of accumulator. The output of AND gate 99 clocks the accumulator 105 to decrement the output word.

An active MSB in the output word of the accumulator 105 turns on switches 107 and 109 to short winding $S_a$ which, coupled by core 111, effectively shorts winding $L_a$ that has an unshorted inductive weight of 16. An active second most significant bit in the output word of the accumulator 105 turns on switches 113 and 115, to short winding $S_b$ which, coupled by core 117, effectively shorts winding $L_b$ that has an unshorted inductive weight of 8. Likewise, the third most significant bit in the output word of the accumulator 105 turns on switches 119 and 121 to short winding $S_c$ which, coupled by core 123, effectively shorts winding $L_c$ that has an unshorted inductive weight of 4. Winding $L_d$ is controlled by winding $S_d$ and the least significant bit of the output word of the accumulator 105 by way of switches 125 and 127 and core 129. Finally, winding $L_e$ has an inductive weight of 1, which is constant. Winding $S_e$, on the same core with winding $L_e$, couples energy from winding $L_e$ to clock 131 by way of diode D7 to provide sustaining power for a constant frequency and duty-cycle gate signal to MOSFET switch 133. The flyback current induced in the windings $L_a$, $L_b$, $L_c$, $L_d$ and $L_e$ passes through rectifier D8 to charge capacitor C3, and is made available as DC power at output termini 101 and 103. Biasing of the power input to clock 131 is provided by resistor R2, capacitor C4 and is voltage limited by Zener diode Z1.

Figure 7:
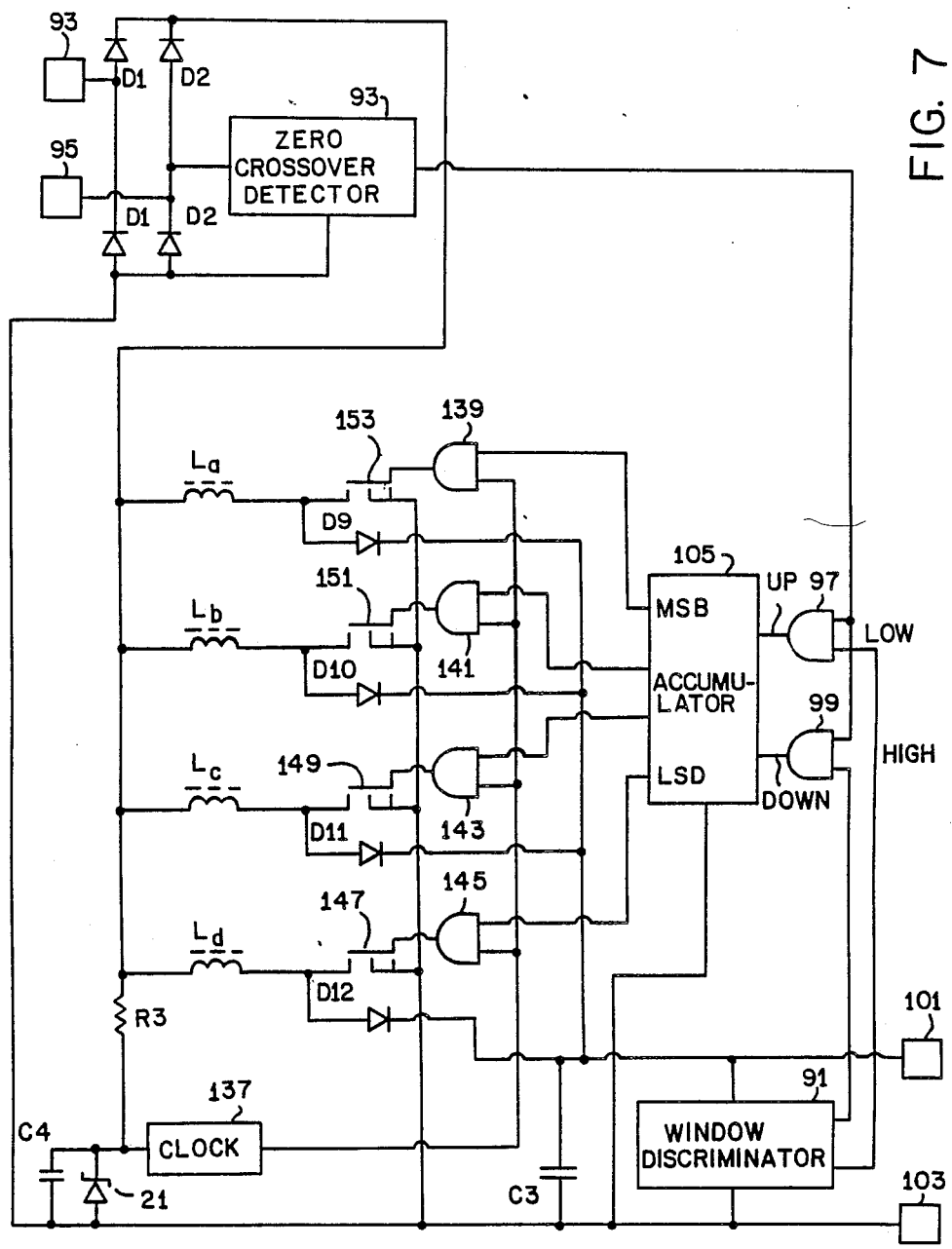
FIG. 7 is a seventh embodiment of the invention illustrating discrete inductances in parallel and a control circuit for varying the effective inductance associated with a flyback-type DC-to-DC converter that provides variable output power.

FIG. 7 shows a parallel implementation of a variable inductance DC-to-DC flyback converter, wherein each discrete inductance $L_a$, $L_b$, $L_c$ or $L_d$ is controlled by a dedicated switch in association with one of the bits from the binary output word of an accumulator 135. Here, the square wave output of a clock 137 partially enables AND gates 139, 141, 143, and 145. When completely enabled by the LSB from the output word of the accumulator 135, AND gate 145 turns on switch 147 for the active time of the output of the clock 137. Inductor $L_d$ has a binary weight of one (1) in this example. Likewise, AND gate 143 controls switch 149, AND gate 141 controls switch 151, and AND gate 139 controls switch 153. Inductor $L_c$ has a binary weight of two (2), inductor $L_b$ has a binary weight of four (4), and inductor $L_a$ has a binary weight of eight (8). The flyback energies in inductors $L_a$–$L_d$ are passed to a capacitor C5 and the DC output terminals 101 and 103 through rectifiers D9, D10, D11 and D12, respectively. A bleed resistor R3, capacitor C4 and Zener diode Z1 are provided to sustain clock oscillator 137. In parallel, the inductances $L_a$–$L_d$ define the inductance L1 of the DC-to-AC converter 11 as follows:

$$\frac{1}{L1} = \frac{1}{L_a} + \frac{1}{L_b} + \frac{1}{L_c} + \frac{1}{L_d} \qquad (3)$$

As indicated by the common numbering between the AC-to-DC converters 10 of FIGS. 6 and 7, the zero crossover detectors, window discriminators and accumulators may be the same in the parallel inductor version of the converter in FIG. 7 as in the series-connected version of FIG. 6. Also, the AND gates 97 and 99 function as gated inputs to the accumulator 105 in both FIGS. 6 and 7. Because the functions of the accumulator 105, discriminator 91, zero crossover detector 93 and AND gates 97 and 99 are the same in FIGS. 6 and 7, an explanation of their functions will not be repeated herein in connection with the converter of FIG. 7.

Figure 8:
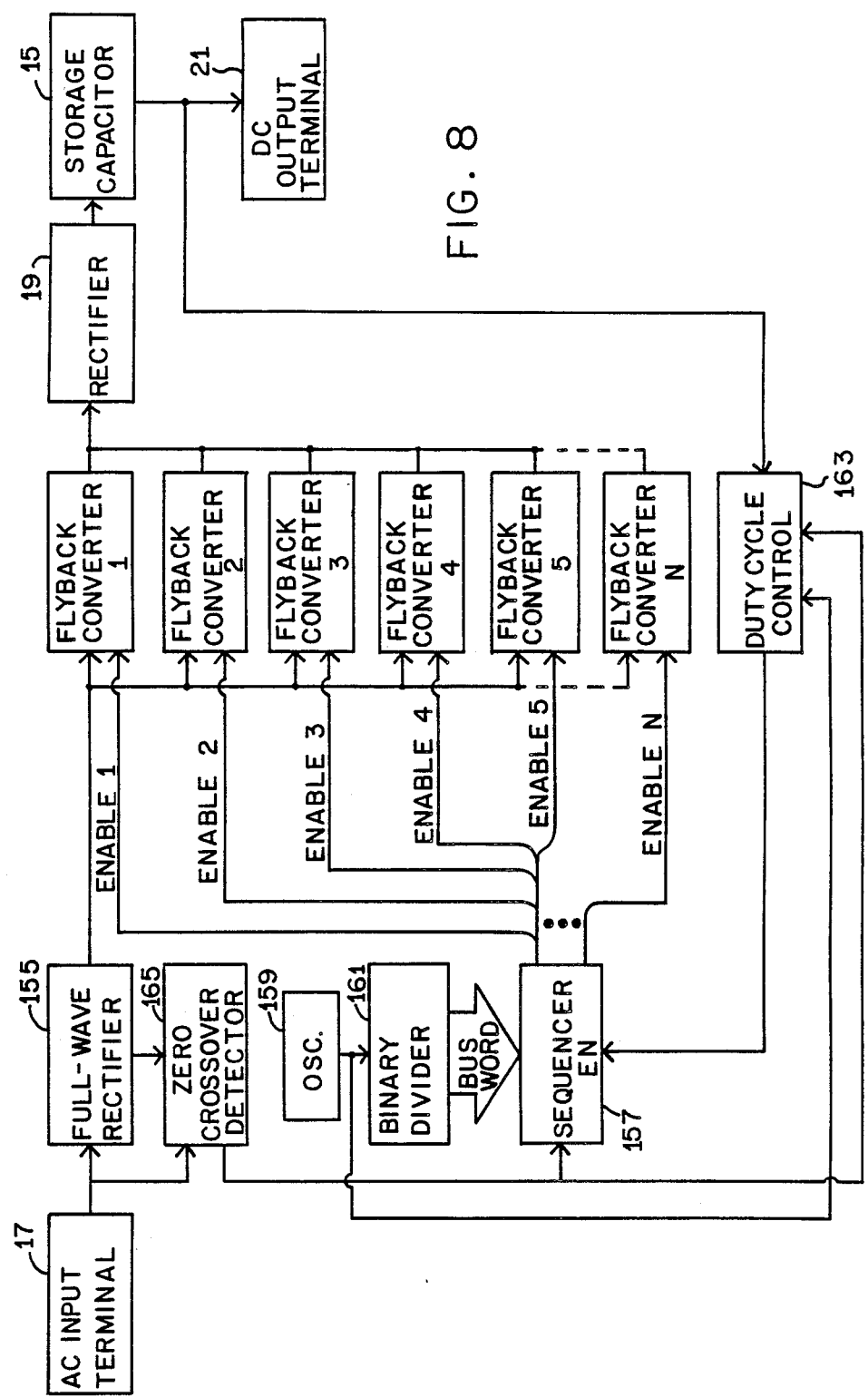
FIG. 8 an eighth embodiment of an AC-to-DC converter according to the invention wherein variable output power is provided by varying the duty cycle of a plurality of flyback-type DC-to-DC converters connected in parallel to provide a higher output power than possible from the single flyback converter embodiments of 2a–2c.

For very high power applications, a plurality of flyback-type DC-to-DC converters 1 through N may be connected in parallel and incorporated into an AC-to-DC converter according to the invention as illustrated in FIG. 8. The flyback converters receive a common rectified AC input from a full-wave recitifer 155 and deliver a DC output to a common DC output terminal 21 and storage capacitor 15 in the same manner as illustrated in the block diagram of FIG. 1. By way of example, each of the flyback converters 1 through N may be similar to any one of the converter shown in FIGS. 2a–2c. However, instead of the MOSFET switch of the converters in FIGS. 2a–2c being directly controlled by a clock, the MOSFET switches of the converters in FIG. 8 are driven by a sequencer 157 which may be a conventional 1 of N decoder whose N outputs provide the base drives for the MOSFET switches in the converters 1-N in response to a binary input. An example of an appropriate sequence is a 74LS137, manufactured by Motorola Inc., Phoenix, Ariz. The binary input word is generated at the parallel inputs to the sequencer 157 by way of an oscillator 159 and binary divider 161. To minimize loading reflections back to the AC power source, the outputs of the sequence 157 may be overlapped in time by monostable means (such as a 74LS123) so that switch transients and the load are distributed evenly amongst the converters. This timing relationship is illustrated by the waveforms in FIG. 9 which exemplify the enable signals 1 through N for the respective flyback converters 1 through N. The result is a load sharing gang of converters according to FIG. 9. The switching transients of any one of the converters occurs in its own time slot, exclusive of disturbances by the other members, and these are not therefore additive in instantaneous intensity.

By providing the output of a pulse-width modulator of conventional design to the enable input (EN) of he sequencer 157, the pulse width of the enable signals 1 through N can be variable. The monostable means may be satisfied by a UC1844 in each converter. The duty cycle control 16 in FIG. 8 is driven by the output of the oscillator 161. The frequency of the output from the duty cycle control 163 is the same as the input from the oscillator 159. The control 163 is responsive to the DC input voltage from the output terminal 21. The change in the duty cycle of the output from the control 163 effects a change in the duty cycle of the overlapping enable pulses 1-N from the sequencer 157. In order to ensure changes in the duty cycle of the enable pulses 1-N occur only during positive-going or negative-going transitions of the AC input signal, the oscillator 159 is phase locked with the output of a zero crossover detector 165 and the adjustment of the duty cycle at the control 163 is enabled by the detector's output.

In summary, the invention provides for the placement of a flyback-type DC-to-AC converter 11 between a rectified AC signal and a load 23 for the purpose of metering power to the load in a 180° out-of-phase relationship with input power. The 180° out-of-phase power relationship isolates the impedance characteristics of the load from the AC input termini 17. The out-of-phase transfer of power from the input termini 17 to the load 23 directly proportions input current to input voltage, thereby maintaining the input power factor at a high value.

I claim:

1. In a power factor maintenance system for preserving a high power factor at otherwise reactive power inputs to an electronic power supply having a rectifier for rectifying an AC input and a filter capacitor for filtering the rectified output, the improvement comprising:
a flyback type or ringing choke power converter interposed between the rectifier and the filter capacitor, said power converter having an operating frequency which is substantially higher than the frequency of the AC input, and means for maintaining the frequency and duty cycle of the power converter constant throughout each cycle of the AC input.

2. The improvement of claim 1 in which the power converter means includes a timing circuit for controlling the frequency and duty cycle of the power converter, and including means for adjusting the duty cycle or pulse width of the timing circuit, but only at positive-going or negative-going zero crossings of the AC power input, but not both.

3. The improvement of claim 2 wherein the timing circuit includes an inductance, and the adjusting means includes digital means for adjusting the value of the inductance, but only at said positive-going or negative-going zero crossings of the AC power input, but not both.

4. The improvement of claim 3 including means for incrementing or decrementing the total inductance value of inductors connected in parallel.

5. The improvement of claim 3 including means for incrementing and decrementing the total inductance value of inductors connected in series.

6. The improvement of claim 1 including digital means for incrementing and decrementing the duty cycle of the timing circuit means.

7. The improvement of claim 6 including digital logic means including a digital adder for summing an addend and an augend to produce a summation, the digital logic means including mans for shifting the phase of the summation most significant bit relative to the augend most significant bit by incrementing or decrementing the addend word value.

8. The improvement of claim 7 including digital logic AND means comparing the augend most significant bit and the summation most significant bit to create as the AND output a duty cycle signal that is varied by incrementing or decrementing the addend word.

9. The improvement of claim 8 including means for applying a high frequency pulse train to a digital counter means for developing a binary word in which the most significant bit occurs at the preferred operating frequency of the power converter means.

10. The improvement of claim 9 in which the binary word developed by the digital counter means is used as the augend word for the digital adder.

11. The improvement of claim 10 including analog-to-digital converter means for developing a binary word value that is incremented and decremented in time and polarity with deviations of the output voltage of the power converter from a predetermined value.

12. The improvement of claim 11 in which the binary word developed by the analog-to-digital converter means as the addend word for the adder means.

13. The improvement of claim 3 including further digital means for inserting or removing discrete binary-weighted inductances from a series or parallel combination of such inductances under the control of a corresponding binary weight in the output word of the digital means, the digital means being responsive to deviations of the output voltage of the converter means from a predetermined value.

14. The improvement of claim 13 wherein a discrete inductance value is removed from a series connection of inductors by shorting a secondary winding comprised by the inductor associated with said inductance value.

15. The improvement of claim 13 wherein a discrete inductance value is removed from a parallel connection of inductors by opening a switch that is series connected with said inductor associated with said inductance value.

16. The improvement of claim 1 comprising multiple power converters that are enabled sequentially for the purposes of distributing the load impact on the system and minimizing the peak instantaneous switching transients that can reflect as noise to the power source and to the load.

17. A method of preventing significant phase shift between a voltage and current of an AC input signal delivering power to a load, the method comprising the steps of:
rectifying the AC input signal from the AC input line;
connecting an electromagnetic inductor means across the rectified AC input signal at rapid, evenly spaced time intervals in order to store energy in a magnetic field of the inductor means during the time of connection;
releasing the energy stored in the magnetic field during times when the inductor means is disconnected from the rectified AC input signal between the spaced time intervals;
rectifying the released energy and directing it to an output terminal means and the load; and
controlling the period of said time intervals and the duration of the connecting time from interval to interval to be substantially constant throughout each cycle of the AC input signal so as to prevent continuous current flow through the inductor means and a resulting phase shift in the input AC signal.

18. A method as set forth in claim 17 including the steps of:
adjusting the volt-time product of the evenly spaced time intervals in response to a change in the characteristics of the load in order to maintain sufficient power to the load;
detecting either positive-going or negative-going zero crossovers of the AC input signal, but not both; and
controlling the timing of the adjustment of the volt-time product of the evenly spaced time intervals to be substantially synchronized with the detection of either positive-going or negative-going zero crossovers.

19. A method as set forth in claim 18 wherein the step of adjusting the volt-time product of the evenly spaced time intervals includes adjusting the inductance value of the electromagnetic inductor means.

20. A method as set forth in claim 18 wherein the step of adjusting the volt-time product of the evenly spaced time intervals includes adjusting the duration of the spaced time intervals.

21. A method as set forth in claim 18 including the steps of:
detecting when the output voltage is above or below a predetermined range of preferred voltages;
accumulating a count of the number of positive-going or negative-going zero crossovers of the AC input signal when the output voltage is above or below the predetermined preferred range of voltages, where a below-range output voltage decrements the count and an above-range output increments the count; and
responding to a change in the count by adjusting the volt-time product of the evenly spaced time intervals so as to increase the volt-time product in response to the count decrementing and decrease the volt-time product in response to the count incrementing.

22. A method as set forth in claim 21 wherein the step of responding to the count includes adjusting the duration time of each time interval.

23. A method as set forth in claim 22 wherein the count is a binary word, the evenly spaced time intervals define a fundamental frequency and the step of responding to the count includes:
deriving the fundamental frequency from the most significant bit of a binary output from a divider/counter responsive to an oscillator;
adding the binary output from the divider/counter to the binary word of the count to provide a binary sum whose most significant bit is characterized by having the same frequency as, but phase shifted with respect to, the most significant bit of the binary output from the divider/counter; and
ANDing the most significant bit of the binary sum and the most significant bit of the binary output from the divider/counter in order to provide the evenly spaced time intervals having adjustable time durations.

24. A method as set forth in claim 21 wherein the step of responding to the count includes adjusting the value of the electromagnetic inductor means.

25. A method as set forth in claim 24 wherein the count is a binary word proportional to the reciprocal of a preferred power output to the load and the electromagnetic inductor means comprises a plurality of discrete inductors, the method comprising the additional steps of:
   associating each discrete inductor with one bit of the binary word;
   providing an inductance value to each discrete inductor which is proportional to the binary position of its associated bit; and
   including in the total inductance for the electromagnetic inductor means only those discrete inductors whose associated binary bits of the binary word are active.

26. A power converter responsive to an AC input signal for delivering power to a load so as to maintain a power factor of approximately one, the power converter comprising in combination:
   an input terminal for receiving the AC input signal;
   a rectifier responsive to the AC input signal at the input terminal for providing a rectified AC signal;
   a flyback converter responsive to the rectified AC signal for metering power to the load in a manner that maintains voltage and current waveforms of the input signal in a substantially linear relationship at the input terminal, over wide variations in the electrical characteristics of the load; and
   the flyback converter further comprising:
      an electromagnetic inductor means and a switch for connecting the electromagnetic inductor means across the rectifier in evenly spaced time intervals, the time intervals having a frequency which is substantially greater than the frequency of the AC input signal and a duty cycle which determines on and off periods of said switch during each interval, and
      means for controlling the frequency and duty cycle of said time intervals to be substantially constant throughout each cycle of the AC input signal so as to prevent continuous current flow through the electromagnetic inductor means and a resulting shift in power factor.

27. A power converter as set forth in claim 26 wherein the flyback converter includes a plurality of flyback converters whose inputs are connected in common and whose outputs are also connected in common;
   means for synchronizing the time intervals for each of the flyback converters in time overlapping relationship in order to distribute the load burden among the flyback converters so that transients from each of the converters are distributed in time and are not additive.

28. A power converter as set forth in claim 26 wherein each interval is associated with a volt-time product and the time between consecutive intervals is associated with a volt-time product such that the volt-time product of each interval is equal to the volt-time product of the time between that interval and the next consecutive interval.

29. A power converter as set forth in claim 26 including:
   a monitor for detecting a change in the amount of power demanded by the load; and
   means responsive of the monitor for varying the volt-time products of the evenly spaced time intervals so that the power metered to the load approximately matches the power demanded by the load; and
   said means for varying the volt-time products cooperating with the means for controlling the frequency and duty cycle so as to synchronize said volt-time product change with zero crossings in the AC input signal, thereby to maintain the frequency and duty cycle of the intervals constant through any cycle of the AC input signal but to allow changes in the frequency and duty cycle of the intervals from cycle to cycle of the AC input signal.

30. A power converter as set forth in claim 29 wherein the means responsive to the monitor includes an accumulator for incrementing or decrementing a binary count in response to an indication from the monitor that a substantial change has occurred in the amount of power demanded by the load.

31. A power converter as set forth in claim 30 wherein the means responsive to the monitor includes an adder responsive to the binary count of the accumulator and a binary word whose most significant bit defines the frequency of the time intervals;
   an output of the adder being a summation of the binary output count of the accumulator and the binary word, the summation having a most significant bit of the same frequency as, but phase shifted with respect to, the most significant bit of the binary word, wherein the amount of the phase shift is proportional to the binary count of the accumulator and the duty cycle of the time intervals.

32. A power converter as set forth in claim 31 wherein the electromagnetic inductor means includes a plurality of discrete inductors associated with the binary word such that each bit of the word is associated with an inductor whose inductance value relative to the inductances of the other inductors is proportional to the binary weight of the bit; and,
   a plurality of switches, each switch responsive to one of the bits of the binary word of the accumulator for selecting which ones of the discrete inductors to be incorporated into the electromagnetic inductance means.

* * * * *